(12) United States Patent
Chua

(10) Patent No.: US 10,571,191 B2
(45) Date of Patent: Feb. 25, 2020

(54) APPARATUS AND METHOD FOR IMPROVED EVAPORATION DRYING

(71) Applicant: SINGNERGY CORPORATION PTE LTD, Singapore (SG)

(72) Inventor: Keng Tai Chua, Singapore (SG)

(73) Assignee: SINGNERGY CORPORATION PTE LTD, Singapore (SG)

( * ) Notice: Subject to any disclaimer, the term of this patent is extended or adjusted under 35 U.S.C. 154(b) by 155 days.

(21) Appl. No.: 15/563,898

(22) PCT Filed: Apr. 6, 2016

(86) PCT No.: PCT/SG2016/050170
§ 371 (c)(1),
(2) Date: Oct. 2, 2017

(87) PCT Pub. No.: WO2016/163955
PCT Pub. Date: Oct. 13, 2016

(65) Prior Publication Data
US 2018/0120025 A1    May 3, 2018

(30) Foreign Application Priority Data
Apr. 7, 2015  (SG) ............................ 10201502704V

(51) Int. Cl.
*F26B 3/34* (2006.01)
*F26B 3/347* (2006.01)
(Continued)

(52) U.S. Cl.
CPC ............ *F26B 3/347* (2013.01); *C02F 11/123* (2013.01); *F26B 3/20* (2013.01); *F26B 17/023* (2013.01);
(Continued)

(58) Field of Classification Search
CPC ...... F26B 3/347; F26B 17/023; F26B 17/026; F26B 3/20; F26B 2200/18; C02F 11/123
(Continued)

(56) References Cited

U.S. PATENT DOCUMENTS 2,301,589 A * 11/1942 Shepard .................... F26B 3/20
159/28.6
3,405,855 A * 10/1968 Daly ...................... B65H 18/20
226/1
(Continued)

FOREIGN PATENT DOCUMENTS

| EP | 0089222 A2 | 9/1983 |
|---|---|---|
| EP | 1826516 A1 | 8/2007 |
| JP | S6146399 A | 3/1986 |

OTHER PUBLICATIONS

Written Opinion and International Search Report of international application PCT/SG2016/050170; International Preliminary Report on Patentability of Application PCT/SG2016/050170.

*Primary Examiner* — John P McCormack
(74) *Attorney, Agent, or Firm* — JCIP; Joseph G. Chu

(57) ABSTRACT

The present invention provides an apparatus 100 for drying a substance 190, the apparatus 100 comprising at least one roller 121 rotatable about a central axis; a first belt 112 having a first side 112' and a second side 112", the first side 112' of the first belt 112 adapted to receive the substance 190; and a plurality of heat induction elements 123 arranged to induce heat in the first belt 112 to heat the substance 190, where in operation, the first belt 112 urges via its first side 112', the substance 190 towards a portion of an exterior circumferential surface of the roller 121, and the substance 190 is heated to remove fluids from the substance 190.

24 Claims, 7 Drawing Sheets

(51) Int. Cl.
  *F26B 3/20* (2006.01)
  *F26B 17/02* (2006.01)
  *C02F 11/123* (2019.01)

(52) U.S. Cl.
  CPC ........ *F26B 17/026* (2013.01); *F26B 2200/18* (2013.01); *Y02W 10/37* (2015.05)

(58) Field of Classification Search
  USPC .......................................................... 34/247
  See application file for complete search history.

(56) References Cited

U.S. PATENT DOCUMENTS

| | | | |
|---|---|---|---|
| 3,878,619 A | | 4/1975 | Hodgett et al. |
| 4,831,746 A | | 5/1989 | Kim et al. |
| 5,037,560 A | * | 8/1991 | Gayman .................. A62D 3/33 210/739 |
| 5,280,151 A | | 1/1994 | Matsunaga et al. |
| 2008/0237390 A1 | | 10/2008 | Okizaki |
| 2015/0265999 A1 | * | 9/2015 | Medoff .................. C08L 97/02 204/157.63 |

* cited by examiner

APPARATUS AND METHOD FOR IMPROVED EVAPORATION DRYING

FIELD OF THE INVENTION

The present invention relates generally to apparatus and methods for the drying of substances, in particular but not limited to evaporation drying of sludge.

BACKGROUND TO THE INVENTION

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

Sludge is a semi-solid slurry which includes but is not limited to sewage sludge, biogas residues, paper sludge, and food and beverage sludge. Sludge variants can carry heavy metals, toxins, pollutants and pathogens. Therefore, if sludge is not properly treated before disposal, there will be a risk of disease spread, heavy metal poisoning and environmental damage. Treatment of sewage or wastewater sludge generated from wastewater treatment plants typically comprises the following steps: thickening, dewatering and drying. Drying by heat removes the sludge's moisture content and can destroy pathogens and neutralise toxins. The removal of moisture and application of heat to dry the sludge can result in safe and easy handling of the dried sludge for downstream treatment/disposal.

Several methods have been developed to dry sludge and these include but are not limited to convection, radiation and indirect (contact or conduction) drying methods. In convection methods, heated dry air is brought into contact with the sludge in a drum or belt dryer; in radiation methods, heat radiated by heating elements is used to dry the sludge, where such heat can come from solar radiation or infrared heating elements; and in indirect methods, the sludge is brought into contact with a surface heated by a heat source for drying.

U.S. Pat. No. 5,091,079 discloses an apparatus which uses two ovens to provide induction heating to reduce sludge especially those sludge containing heavy metal and a vacuum evacuation chamber to draw gases and vapours from the sludge being reduced, where the sludge travels through the apparatus along a single conveyor belt.

KR Patent Registration No. 10-1005086 and KR Patent Registration No. 10-0976243 disclose a sludge drying apparatus which uses a heated roller or drum to dry sludge. Thermal oil is used as a heating medium where it is pumped to the interior of the roller, and conducts heat to the roller's interior circumferential surface. The conducted heat then travels to the exterior circumferential surface of the roller, against which the sludge being dried is compressed via a belt. There are several disadvantages associated with these drying apparatuses. Firstly, heat is conducted from the side of the sludge in contact with the roller to the other side, where moisture and evaporated vapour has to travel across the thickness of the sludge in order to escape, since the roller will likely have an impenetrable/non-porous surface to prevent the thermal oil from leaking out. Therefore thickness of sludge being treated is limited due to the way heat is conducted only at one side of the sludge and the relatively long escape route of the moisture and vapour from one side of the sludge to the other. Secondly, the thermal oil has to be continuously recirculated from the rollers to boilers/heaters to replenish any heat loss. During such recirculation, there is inherent heat loss along the thermal oil piping, boiler/heater and portions of the rollers which are not used to dry the sludge, thereby leading to energy inefficiencies.

Thirdly, boilers/heaters, thermal piping and large pumps to circulate the oil will result in a large footprint for the entire apparatus. Fourthly, for single or multiple rollers configurations, the thermal oil is typically drawn from the same source, i.e. a single boiler. Therefore, the drying temperature cannot be accurately controlled and varied at different drying stages. Fifthly, heating temperature is limited by the maximum thermal oil operating temperature. Finally, a substantial amount of time (approximately one hour) is required to warm the apparatuses from room temperature to the desired drying temperature. Furthermore, as it will be unsafe to conduct maintenance and repair works while the apparatuses are still hot, a substantial amount of time is required to fully cool the apparatuses down—typically more than 3 hours to cool down and reach 100° C.

Therefore there is a need to alleviate problems in the prior art, such as to increase the efficiencies of the drying process of the prior art apparatuses, further reduce the moisture content of treated sludge, improve the quality of end products, decrease the foot print of the prior apparatuses, and improve the time required for heating and cooling down.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

The above mentioned need is met at least in part and an improvement in the art is made by an apparatus in accordance with this invention.

In accordance to a first aspect of the invention, there is an apparatus for drying a substance, the apparatus comprising: at least one roller rotatable about a central axis; a first belt having a first and a second side, the first side of the first belt adapted to receive the substance; and a plurality of heat induction elements arranged to induce heat in the first belt to heat the substance, where in operation, the first belt urges via its first side, the substance towards a portion of an exterior circumferential surface of the roller, and the substance is heated to remove fluids from the substance.

The fact that the induction heating elements are arranged to heat the first belt allows for a portion of the substance in contact with the first side of the first belt is heated faster than the other portions of the substance, hence creating a shorter moisture and vapour escape route because moisture and vapour located at the same side as the first belt will evaporate first, and by capillary pressure, draw more moisture and water to that surface. Further, there is increased pressure imparted onto the sludge as the belt compresses the sludge against a portion of the outer circumferential surface of the roller. This increases the compactness and surface area of the sludge that is in contact with the heated belt. As a result, moisture and water evaporate at a much higher rate than the apparatuses in the prior art. Moreover, thicker sludge can be processed, thereby increasing treatment capacity. Furthermore, instead of using a thermal fluid, the present invention uses induction heating elements which are preferred because firstly, a boiler/heater, piping and pump are no longer required, resulting in the apparatus having better energy efficiency (e.g. less unnecessary heat loss to other components of the apparatus) and taking up less space; secondly, higher operating temperatures can be used and more control with accurate and responsive temperature settings at various drying stages can be achieved; and thirdly the desired operating temperature can be achieved in a short period of time and the apparatus can be cooled down quickly.

Preferably, the at least one roller is constructed substantially from a non-metal material. More preferably, the first belt comprises a metal, and even more preferably, the first belt is made of fine metal fibres, and wherein the first belt is porous.

Preferably, at least one heat induction element is arranged within the roller, proximate to and about a portion of an interior circumferential surface of the roller. Preferably, at least one heat induction element is arranged proximate to and about the portion of the exterior circumferential surface of the roller, where in operation, the substance and the first belt is driven between the portion of the exterior circumferential surface of the roller and the heat induction element.

Preferably, the apparatus further comprises at least one tensioning means adapted to tension the first belt.

Preferably, the apparatus further comprises a dislodging means for dislodging the substance from the first belt.

Preferably, the apparatus further comprises a second belt having a first and second side, where in operation, the substance is sandwiched between the first side of the first belt and the first side of the second belt, and wherein the first belt urges via its first side, the substance and the second belt towards the portion of the exterior circumferential surface of the roller.

Preferably, the second belt comprises a metal, more preferably, the second belt is made of fine metal fibres, and wherein the second belt is porous.

Preferably, the plurality of heat induction elements is arranged to induce heat in the second belt to heat the substance.

Preferably, the apparatus has a plurality of rollers, where in operation, the second belt urges via its first side, the substance and the first belt towards a portion of an exterior circumferential surface of at least one roller.

Preferably, the apparatus further comprises at least one tensioning means adapted to tension the second belt.

Preferably, the apparatus further comprises a dislodging means for dislodging the substance from the second belt.

Preferably, the apparatus further comprises an exhaust adapted to remove fluids from the apparatus.

Preferably, the apparatus further comprises a ventilator adapted to remove fluids from a surface of the substance.

Preferably, the apparatus further comprises a device adapted to distribute the substance on the first side of the first belt.

In accordance to a second aspect of the present invention, there is a roller for use in an apparatus according to the first aspect of the present invention, the roller comprising a plurality of projections arranged on a portion of the exterior circumferential surface of the roller.

Preferably, the projections are constructed from a material different from the material of the roller.

Preferably, the plurality of projections comprise ridges arranged substantially along the length of the roller on the exterior circumferential surface of the roller.

Preferably, the plurality of projections comprise ridges arranged circumferentially on and around a portion of the exterior circumferential surface of the roller.

Preferably, the exterior circumferential surface of the roller comprises channels to permit the escape of vapour.

Preferably, the plurality of projections and channels are arranged on a surface of a sleeve, and wherein the roller is adapted to fit into the sleeve.

Preferably, the roller comprises a metal layer on a portion of the exterior circumferential surface of the roller.

In accordance to a third aspect of the present invention, there is a method of drying a substance, the method comprising the steps of: distributing the substance on a first belt having a first and a second side, the first side of the first belt adapted to receive the substance; inducing heat in the first belt via a plurality of heat induction elements; urging the substance via the first side of the first belt towards a portion of an exterior circumferential surface of at least one roller rotatable about a central axis; and heating the substance to remove fluids from the substance.

Preferably, at least one heat induction element is arranged within the roller, proximate to and about a portion of an interior circumferential surface of the roller.

Preferably, at least one heat induction element is arranged proximate to and about the portion of the exterior circumferential surface of the roller, and wherein the method further comprises the step of driving the substance and the first belt between the portion of the exterior circumferential surface of the roller and the at least one heat induction elements.

Preferably, the method further comprises tensioning the first belt.

Preferably, the method further comprises the step of dislodging the substance from the first belt.

Preferably, the method further comprises the step of sandwiching the substance between a first side of a second belt and the first side of the first belt, and urging via the first side of the first belt, the substance and the second belt towards a portion of the exterior circumferential surface of the roller.

Preferably, the method further comprises the step of inducing heat in the second belt via the heat induction elements to heat the substance.

Preferably, the method further comprises the step of urging via the first side of the second belt, the substance and the first belt towards a portion of an exterior circumferential surface of at least one roller, wherein there is a plurality of rollers.

Preferably, the method further comprises tensioning the second belt.

Preferably, the method further comprises the step of dislodging the substance from the second belt.

Preferably, the method further comprises the step of removing fluids via an exhaust.

Preferably, the method further comprises the step of removing fluids from a surface of the substance via a ventilator.

BRIEF DESCRIPTION OF THE DRAWINGS

The invention will now be described, by way of example only, with reference to the accompanying drawings, in which.

Figure 1:
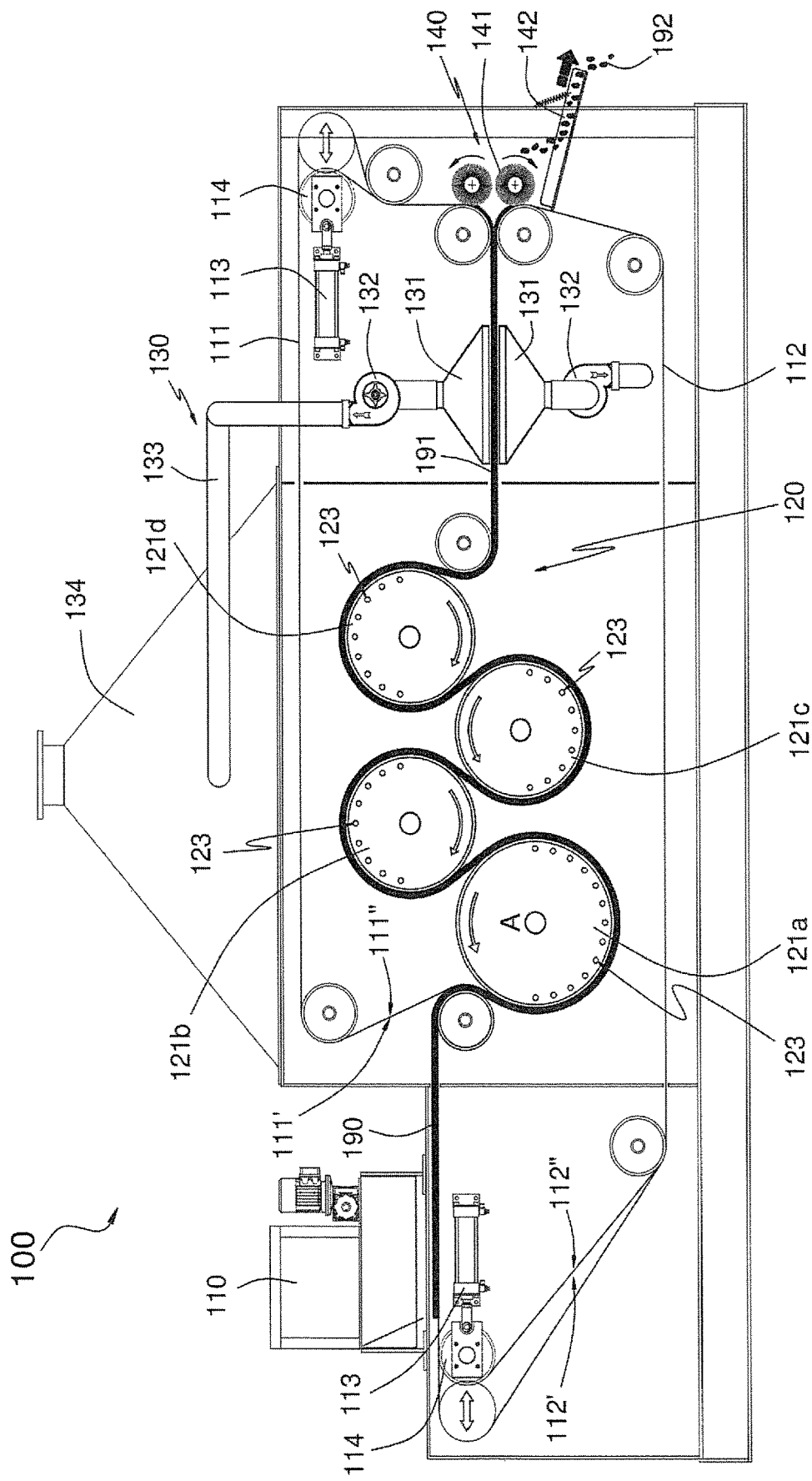
FIG. 1 shows an illustrative view of a first embodiment of an apparatus of the present invention.

Other arrangements of the invention are possible and, consequently, the accompanying drawings are not to be understood as superseding the generality of the preceding description of the invention.

PREFERRED EMBODIMENTS OF THE INVENTION

Particular embodiments of the present invention will now be described with reference to the accompany drawings. The terminology used herein is for the purpose of describing particular embodiments only and is not intended to limit the scope of the present invention. Other definitions for selected terms used herein may be found within the detailed description of the invention and apply throughout. Additionally, unless defined otherwise, all technical and scientific terms used herein have the same meanings as commonly understood by one or ordinary skill in the art to which this invention belongs. Where possible, the same reference numerals are used throughout the figures for clarity and consistency.

The term "substance" used throughout the specification refers to a material or materials which contain fluids that needs to be removed or reduced, and such materials include but are not limited to industrial waste such as wastewater treatment sludge, food and/or dairy products, food waste and pharmaceutical drugs. "Fluids" used throughout the specification include liquids (e.g. water and moisture) and gases (e.g. vapour).

A "heating element" used throughout the specification may be any suitable element which produces, conducts, convects, radiates and/or induces heat in a component of the apparatus such as the belts, and includes but is not limited to metal, ceramic, composite heating elements. Therefore the term "heat" used throughout the specification includes heating by conduction, convection, radiation and induction. An example of a heating element is a heat induction element (e.g. induction heating coil) or an electric heating coil.

Referring to FIG. 1 which provides a first embodiment of the present invention, a drying apparatus 100 includes a feeder 110, a drying chamber 120, a ventilator 130 and a discharge station 140. The apparatus 100 also includes two endless filter belts, upper (second) belt 111 and lower (first) belt 112, processing rollers 121, and heat induction elements 123. As used throughout the specification, a "heat induction element" refers an element which produces an oscillating magnetic field as a result of an alternating electrical current passing through it. The oscillating magnetic field is capable of inducing a magnetic flux and producing eddy currents in a neighbouring metal, which as a result of the resistance of the neighbouring metal, heat is induced in the neighbouring metal. The belt 111 has a first side 111' and a second side 111" and the belt 112 has a first side 112' and a second side 112". The belts 111, 112 are capable of being tensioned by air cylinders 113 which are connected to both shaft ends of take-up rollers 114.

The belts 111 and 112 are made of metal, which includes but is not limited to aluminium, copper, brass, iron, steel, alloys and composites thereof. It would be appreciated that the material selected to form belts 111 and 112 comprises a resistive material which allows for efficient generation of heat by induction and a conductive material which allows for the substantially homogenous distribution of the heat. The belts 111 and 112 preferably have pores and/or slots. Preferably, the belts 111 and 112 are made of fine metal wire, where the belts 111, 112 are porous with very fine pore size. The belts 111, 112 are preferably porous so that the magnetic fields and induced currents generated by the heat induction elements 123 can effectively penetrate the belts 111, 112 and efficiently heat the belts 111, 112. However depending on application, it would be appreciated that the belts 111, 112 may be made from other suitable material, such as synthetic fabrics, which can incorporate metals that can be heated via induction by heat induction elements 123.

The processing rollers 121 are preferably constructed substantially from a non-metal material, which includes but is not limited to ceramics, glass fibers, and composites thereof. Preferably, at least the cylindrical portion of the rollers 121, to which the belts 111, 112 will be in contact with during operation of the present invention, are made from a non-metal material. Even more preferably, the processing rollers 121 do not comprise metal at all. The absence of metal or minimal amount of metal in the processing rollers 121 will ensure that heat does not unnecessarily get induced in the rollers 121 by the heat induction elements 123. This will allow for more effective energy transfer and energy utilization of the apparatus 100 since the heat induction elements 123 will only induce heat in the belts 111, 112 for heating the sludge 190. Each processing roller 121 is rotatable about their own central axis in, for example, a direction A. Depending on the placement of the processing roller 121, said roller may rotate in a clockwise or anticlockwise direction when viewed from one side of the apparatus 100—for example, processing roller 121a is rotating in an anticlockwise direction as viewed in FIG. 1. When in operation, a motor (not shown) rotates the processing rollers 121 which in turn move and drive the belts 111, 112 along with input sludge 190 through the drying chamber 120. It would be understood that the belts 111, 112 may be driven by another roller which is not a processing roller 121, or by any other suitable means. It would also be understood that only one driving means may be involved in moving and driving belts 111, 112.

Figure 2:
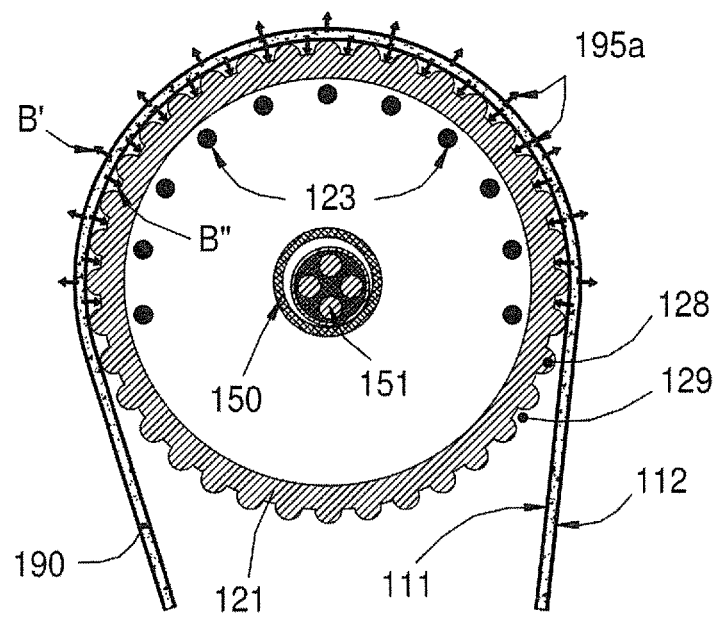
FIG. 2 shows an enlarged cross-sectional view of an embodiment of a roller of the apparatus of FIG. 1.

FIG. 2 provides an enlarged cross-sectional view of an embodiment of the roller 121, the belts 111, 112 and sludge 190 of FIG. 1. Heat induction elements 123 are arranged within the roller 121, proximate to and about a portion of an interior circumferential surface of the roller 121. The number of heat induction elements 123 installed within roller 121 will depend on application and requirements. It is advantageous for the heat induction elements 123 to be located within the roller 121, to provide modularity to the rollers 121 which allows for easier setting up of the apparatus 100 since each roller 121 may be supplied and installed in apparatus 100 as a single module. As a result of the modularity of the rollers 121, the entire apparatus 100 will require less space to operate. The modular capability of the roller 121 also improves customization of the roller 121 where each roller 121 in the apparatus 100 may have different features, e.g. dimensions, number of heating elements 123 and characteristics of exterior circumferential surfaces. Heat induction elements 123 are preferably stationary during operation of the apparatus 100 so that optimal heat induction is achieved at the portion where the belts 111, 112 are in maximum contact with the roller 121. However depending on application, the heat induction elements 123 may rotate together with the roller 121 when in operation, about the central axis of roller 121. The roller 121 also includes a hollow shaft 150, about which the roller 121 rotates in operation and to which the roller 121 is attached to the apparatus 100, and an inlet 151 for cables for powering heat induction cables 123. It will be appreciated that the distance between the heat induction elements 123 and the interior circumferential surface of the rollers 121 may be individually adjustable depending on application and requirements.

The heat induction elements 123 are connected to a source of high frequency electrical power source which is capable of providing high frequency alternative current (not shown). Magnetic fields and induced currents are produced at the heat induction elements 123. Examples of suitable heat induction elements used in the generation of heat in the belts 111, 112 are described in U.S. Pat. No. 5,133,402 and US Publication No. 2012/0318461 A1. It will be understood that depending on application and requirements, other forms of induction heating methods and induction heating elements may be used. It would be appreciated that other forms of heating elements, e.g. electric heating coils which transmit heat via convection, conduction and/or radiation may also be used in the present invention, as a replacement of or preferably as an addition to heat induction elements 123. The use of heat induction elements 123 allow for the operating temperature of drying apparatus 100 to be reached very quickly from room temperature, within a few seconds, and also allows the drying apparatus 100 to be cooled down very quickly, within a few minutes, which can be assisted by cooling means known in the art, e.g. a fan or blower. Operating temperatures of drying apparatus 100, can range from 100° C. to 400° C., preferably range from 200° C. to 400° C., and even more preferably, range from 200° C. to 300° C. Temperatures as high as 400° C., more preferably 350° C., are preferred for certain inorganic sludge, while temperatures as low as or slightly above 100° C. are preferred for certain non-sludge drying applications.

Figure 2A:
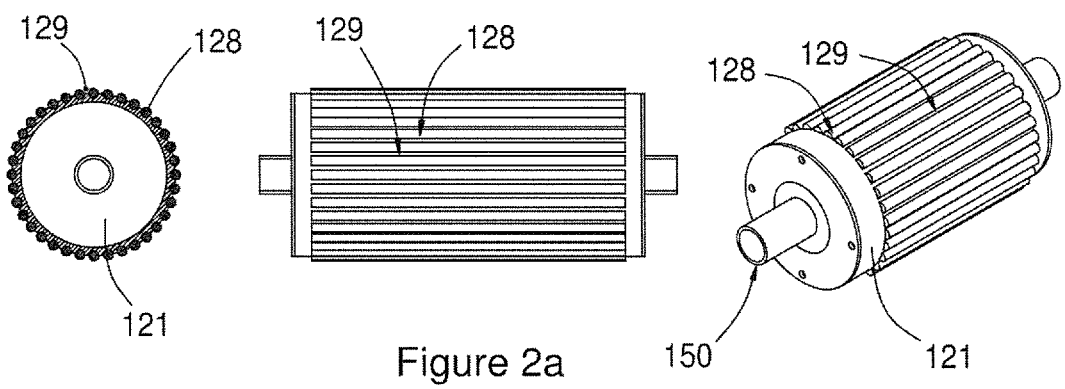
FIGS. 2a and 2b show embodiments of a roller of the apparatus of FIG. 1.
Figure 2B:
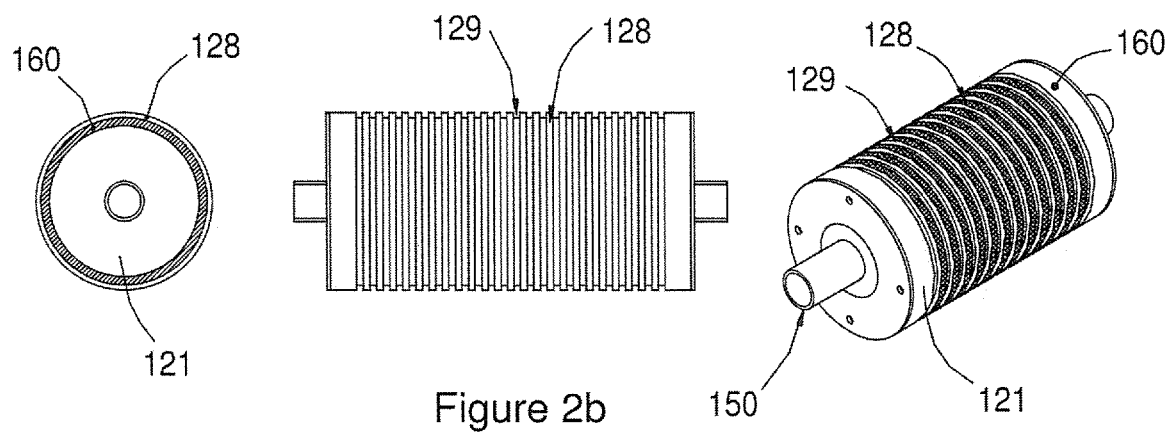

The exterior circumferential surface of roller 121 has projections 128 which are integral and unitary with the roller 121. Projections 128 may be formed from the exterior circumferential surface of roller 121. Projections 128 may be arranged on the entire exterior circumferential surface of the roller 121 or a portion thereof. The projections 128 preferably have a hemispheric cross-sectional shape as shown in FIG. 2. Therefore in operation, the second sides 111", 112" of the belts 111, 112 will be in contact with the apical portion of the hemispheric projections 128. However depending on application, the projections 128 may have other cross-sectional shapes, e.g. a polygonal cross-section. When belts 111, 112 are heat up, liquid at the outer side of sludge 190 will turn into vapour 195a and escape through the belts 111, 112. Vapour 195a will escape through the outer belt (i.e. the belt furthest from roller 121, which is lower (first) belt 112 in FIG. 2) as shown by arrows B' and vapour 195a will escape through the inner belt (i.e. the belt closest to the roller 121, which is upper (second) belt 111 in FIG. 2) through channels 129 as shown by arrows B". Projections 128 may be discrete projections or as shown in FIG. 2a, projections 128 are ridges 128 that run substantially along the length of the roller 121 on its exterior circumferential surface. Ridges 128 define channels 129 which also run substantially along the length of the roller 121 on its exterior circumferential surface. In an alternative arrangement as shown in FIG. 2b, projections 128 comprises ridges 128 arranged circumferentially (i.e. transverse the length of the roller 121) on and around a portion of the exterior circumferential surface of the roller 121. Channels 129 also run circumferentially on and around the exterior circumferential surface of the roller 121. This arrangement is preferable because during operation, shear stress between the belts 111, 112 and the ridges 128 is reduced compared to the arrangement of the ridges 128 in FIG. 2a. This in turn reduces wear-and-tear on the roller 121, ridges 128 and belts 111, 112. Moreover, the arrangement of the ridges 128 in FIG. 2b allow for vapour 195a escaping from the inner belt, to easily exit via channels 129, for example, at an area where the belt 111, 112 is not in contact with the roller 121. It will be appreciated that ridges 128 and channels 129 may be formed on a separate sleeve 160, whereby the roller 121 is adapted to fit into the sleeve 160. This will provide for easier customization of the exterior circumferential surface of the roller 121 so that the apparatus 100 may be adapted for various applications.

Figure 3:
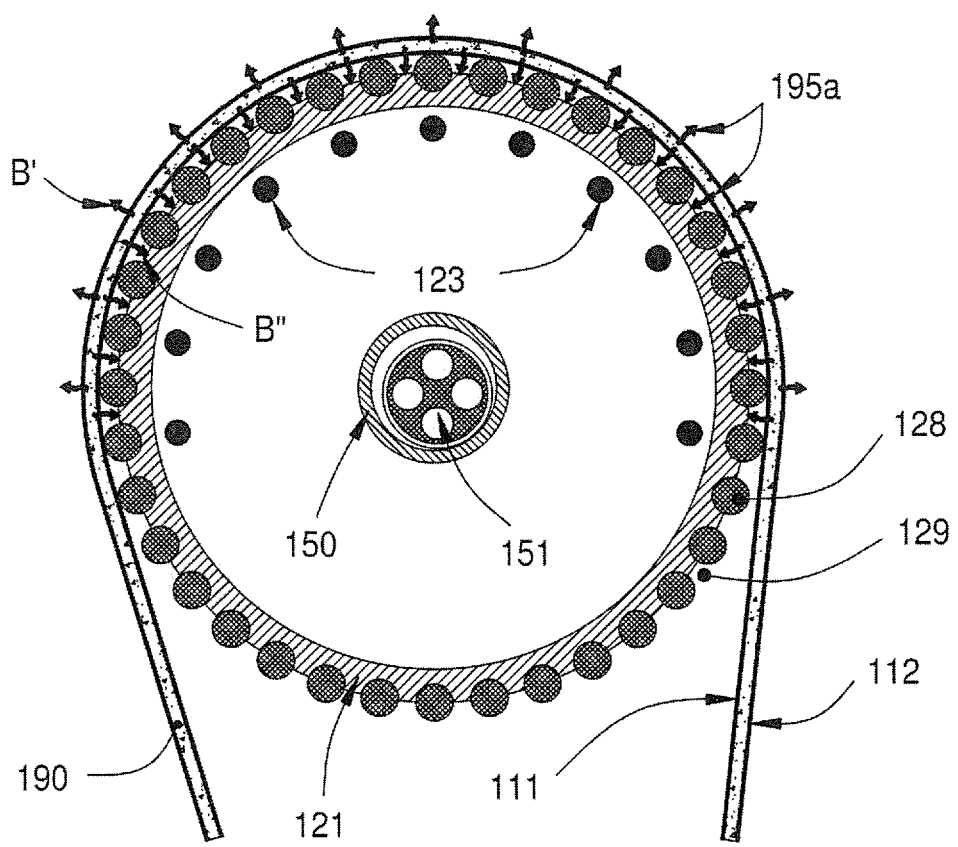
FIG. 3 shows an enlarged cross-sectional view of another embodiment of a roller of the apparatus of FIG. 1.

FIG. 3 provides a cross-sectional view of another embodiment of roller 121, where projections 128 are formed from a material different from that of the roller 121. This is advantageous because this leads to better customization, where the material forming projections 128 may have different properties compared to the material forming the roller 121. For example, the projections 128 may be made from a material which can withstand high temperatures (for example temperatures ranging from 100° C. to 400° C.), is resistant to wear-and-tear and is anti-abrasive, while the roller 121 may be made from a material which can withstand high temperatures (for example temperatures ranging from 100° C. to 400° C.) and is strong enough to withstand compression. Preferably the material forming the projections 128 is a non-metal. Projections 128 may be formed from materials which include but are not limited to ceramic, silicone polymer and composites thereof, and roller 121 may be formed from materials which include but are not limited to ceramics, glass fibers or compositions thereof. Projections 128 are embedded, integrated into and bonded/attached to the exterior circumferential surface of roller 121 by means known in the art, which include is but not limited to welding. As shown in FIG. 3, projections 128 have a generally annular cross-section, where substantially half of the cross-sectional area of projections 128 is embedded in the roller 121 along its exterior circumferential surface, and the exposed half of the projections 128 come into contact with belts 111, 112 during operation. Projections 128 may be in the form of ridges 128 as shown in FIGS. 2a and 2b.

The surfaces of rollers 121 are preferably continuous, i.e. having no slots and/or pores, so that the heat induction elements 123 in the interior of the rollers 121, will not be exposed to fluids, e.g. vapours emitted by the sludge 190, which could damage the heat induction elements 123.

Returning to the embodiment in FIG. 1, when in operation, the feeder 110 feeds and distributes the sludge 190 onto the first side 112' of lower belt 112, and the first side 111' of upper belt 111 comes into contact with the sludge 190, which is held in between and is sandwiched by the belts 111, 112 before contacting the first processing roller 121a. When in contact with the first roller 121a, the heat induction elements 123 induce heat in the belts 111, 112 via magnetic fields generated by the heat induction elements 123. Preferably, heat is generated concurrently in both belts 111, 112. However it would be appreciated that heat in the upper belt 111 may be generated faster than heat in the lower belt 112 because the upper belt 111 is nearer to the heat induction elements 123 compared to the lower belt 112. In such a situation, the rate of removal of fluids (e.g. evaporation of moisture) at the upper belt may be higher than that in the lower belt 112. While the sludge 190 held in between the belts 111, 112 negotiates about the arc of the exterior circumferential surface of the processing rollers 121, the sludge 190 is squeezed due to radial movement, increasing pressure impact and shear on the sludge 190 resulting in higher compactness and larger contact area with belts 111, 112. Using processing roller 121a as an example, when in operation, lower belt 112 urges via its first side 112', the sludge 190 and the upper belt 111 towards the exterior circumferential surface of said processing roller 121a, thereby squeezing and compacting the sludge 190. The urging mechanism of the belts 111, 112 towards the exterior circumferential surface of processing rollers 121 is achieved by the tensioning of the belts 111, 112 by air cylinders 113 and take-up rollers 114. The air cylinders 113 and take-up rollers 114 can maintain or vary the tension in the belts 111, 112, and affect the compacting of the sludge 190.

At the beginning of the drying process, fluids within the sludge 190 are evaporated via heat conduction, having contact with the first sides 111', 112' of the heated belts 111, 112. As fluids are heated away at the sludge surface (e.g. evaporation of moisture), areas of low pressure are created at the sludge surface which will cause fluids to flow from inner portions of sludge 190 to the surface of the sludge 190 in contact with the first sides 111', 112' of the belts 111, 112 by capillary pressure.

After the first processing roller 121a, the belts 111, 112 and sludge 190 progress to the second processing roller 121b and heat induction elements 123. At this stage, heat is again generated by heat induction elements 123 in the belts 111, 112 and fluids within the sludge 190 are heated away, similar to the drying process as described above at first processing roller 121a.

Similar heating and drying processes continue in the following third and fourth processing rollers 121c, 121d. As more fluids within the sludge 190 are heated away, e.g. via evaporation along the drying process, the sludge 190 becomes thinner, which allows for better heat penetration into the centre of the sludge 190.

The number of processing rollers can be increased or reduced depending on the application and requirements. The movement speed of the belts 111, 112 and the temperature generated in the belts 111, 112 by heat induction elements 123 are adjustable, which allow a user to easily configure the apparatus 100 to achieve the desired dryness of the substance (e.g. sludge 190) at the end of the drying process. Drying temperature and drying duration are two main parameters in achieving optimal drying of a substance. For drying of inorganic sludge such as hydroxide/metal sludge, short drying duration with high drying temperatures of about 200° C.-400° C. would be preferred, where two to four processing rollers 121 would be sufficient. For drying of certain food substances, longer drying duration with low drying temperatures of about 100° C.-200° C. would be preferred, where four or more processing rollers 121 would be sufficient.

Immediately after the drying process, the sludge 190 is hot and fluids such as moisture and water vapour are adhered to the surface of dried sludge cake 191. A moisture ventilator 130 is installed immediately after the drying process to further improve the dryness of sludge cake 191. The moisture ventilator 130 includes two hoods 131 which are located in close proximity to the belts 111, 112. Blowers 132 are installed at the inlets of hoods 131, which create an air draft across the surface of sludge cake 191, thereby removing fluids adhered to the surface of sludge cake 191 and exhaust them to the hood 134 of the drying apparatus 100 via pipes 133. With the fluids removed from the sludge cake's 191 surface, the fluids are prevented from being re-absorbed back by the dried sludge cake.

A hood 134 located on top of the drying chamber 120 is connected to a blower (not shown). The vapour and gases produced and accumulated during the drying process are removed through the hood 134 for further treatment.

The dried sludge cake 191 proceeds to the discharge station 140 at the end of drying apparatus 100, where two motorized brushes 141 are installed to brush the dried sludge 191 off the belts 111, 112, and also simultaneously clean the belts 111, 112. The sludge cake 191 would be crushed into small pieces 192 as it is brushed off, especially those in a "pancake" shape, and will finally drop into the discharge chute 142. The small pieces of sludge cake 192 increases the total surface area for further evaporation of residual fluids, which as a result, improves the dryness of final sludge cake.

Figure 4:
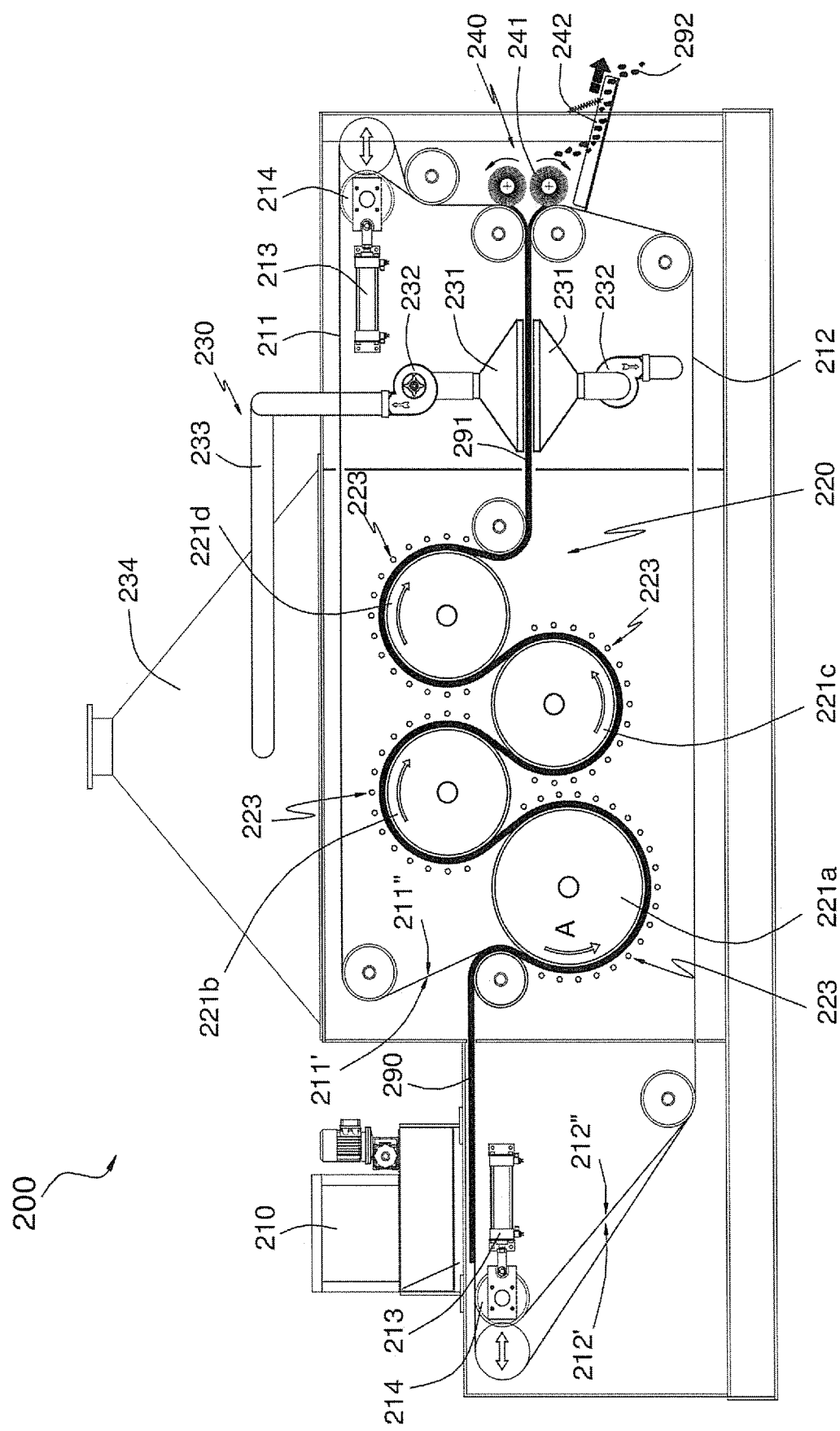
FIG. 4 shows an illustrative view of a second embodiment of an apparatus of the present invention.

In a second embodiment of the present invention as shown in FIG. 4, a drying apparatus 200 includes a drying chamber 220 having processing rollers 221 and heat induction elements 223. In this embodiment, the heat induction elements 223 are arranged proximate to and about a portion of the exterior circumferential surface of the processing rollers 221. Drying apparatus 200 operates in a similar manner as drying apparatus 100, except that when in operation, belts 211, 212 move or are driven between the heat induction elements 223 and the processing rollers 221. The heat induction elements 223 will induce heat in the belts 211, 212 via magnetic fields generated by the heat induction elements 223. Preferably, heat is generated concurrently in both belts 211, 212. However it would be appreciated that the heat in the belt closer to the heat induction elements 223 may be induced at a faster rate compared to the heat in the belt further away from the heat induction elements 223. In such a situation, the rate of removal of fluids (e.g. evaporation of moisture) at one belt (i.e. the belt that heats up faster) may be higher than that in the other belt.

Figure 5:
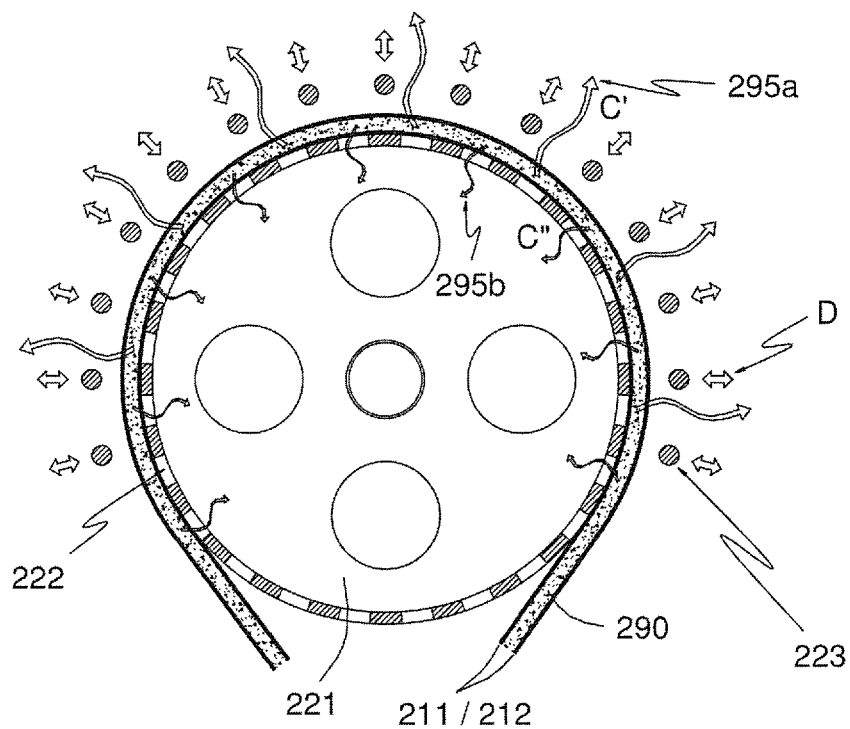
FIG. 5 shows an enlarged cross-sectional view of an embodiment of a roller of the apparatus of FIG. 4.

FIG. 5 provides an enlarged cross-sectional view of the roller 221, the belts 211, 212 and sludge 290 of FIG. 5. Heat induction elements 223 are arranged proximate to and about a portion of the exterior circumferential surface of the processing roller 221. The distance between heat induction elements 223 and belts 211, 212 can be individually adjusted (D) to obtain desired drying results. Depending on the application and requirements, this distance may vary. This distance may also be predetermined such that once an optimal distance is determined, said distance between the heat induction elements 223 and the belts 211, 212 will not change.

As heat is induced in belts 211, 212, fluids, such as moisture, are driven from the sludge 290. Vapour 295a at the outer side of sludge 290 escapes through the outermost belt 212 (it would be appreciated that this will depend on which processing roller 221, the belts 211, 212 are positioned) via the slots/pores in the belt 212 as indicated by arrows C' and vapour 295a at the inner side of the sludge 290 closest to the processing roller 221 escapes through the innermost belt, e.g. belt 211 via slots/pores of belt 211 and slots or pores 222 of the wall of the processing roller 221 as indicated by arrows C".

Figure 5A:
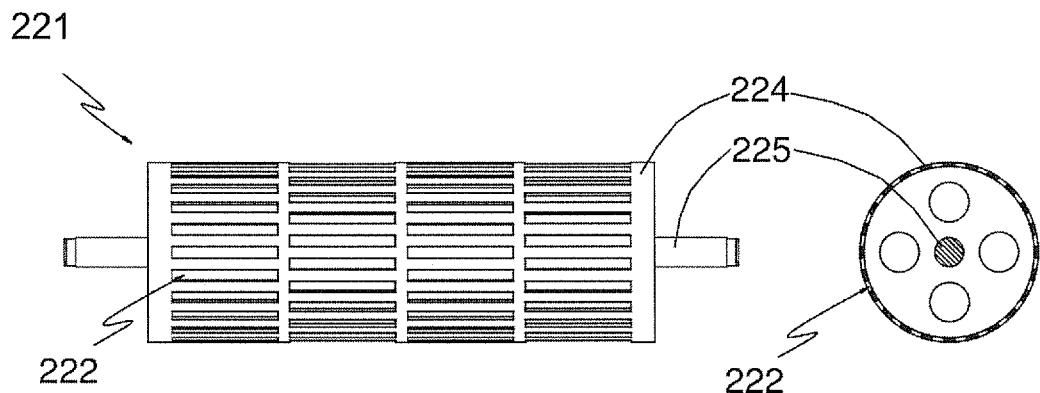
FIGS. 5a and 5b show other embodiments of a roller of the apparatus of FIG. 4.
Figure 5B:
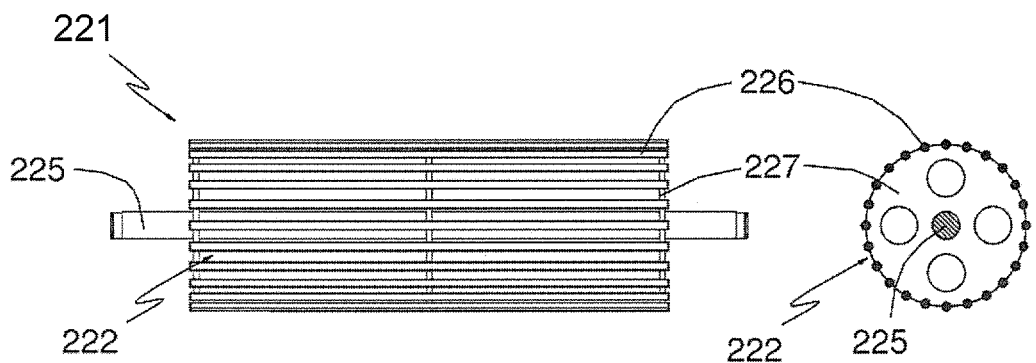

FIGS. 5a and 5b show a first and second embodiment of the processing roller 221 of FIG. 4. In FIG. 5a, the processing roller 221 has a circumferential surface 224 with an array of slots 222. The slots 222 allow the escape of vapour, gases and/or moisture from the portion of the sludge 290 closest to the roller 221. In FIG. 5b, the processing roller 221 has rods 226 which are joined onto outer flanges 227 at predetermined distances to create slots 222 on the circumferential surface of the processing roller 221, which allow the escape of vapour, gases and/or moisture from the portion of the sludge 290 closest to the roller 221. The roller 221 is installable in the apparatus 200 via axle or shaft 225. The roller 221 is rotatable about its central axis which runs lengthwise through axle or shaft 225.

Roller 221 is preferably constructed substantially from a non-metal material, which includes but is not limited to ceramics and composites thereof. Preferably, at least the cylindrical portion of the rollers 221, to which the belts 211, 212 will be in contact with during operation of the apparatus 200, are made from a non-metal material. Even more preferably, the processing rollers 221 do not comprise metal at all. The absence of metal or minimal amount of metal in the processing rollers 221 will ensure that heat does not unnecessarily get induced in the rollers 221 by the heat induction elements 223. This will allow for more effective energy transfer and energy utilization of the apparatus 200 since the heat induction elements 223 will only induce heat in the belts 211, 212 for heating the sludge 290.

Figure 6:
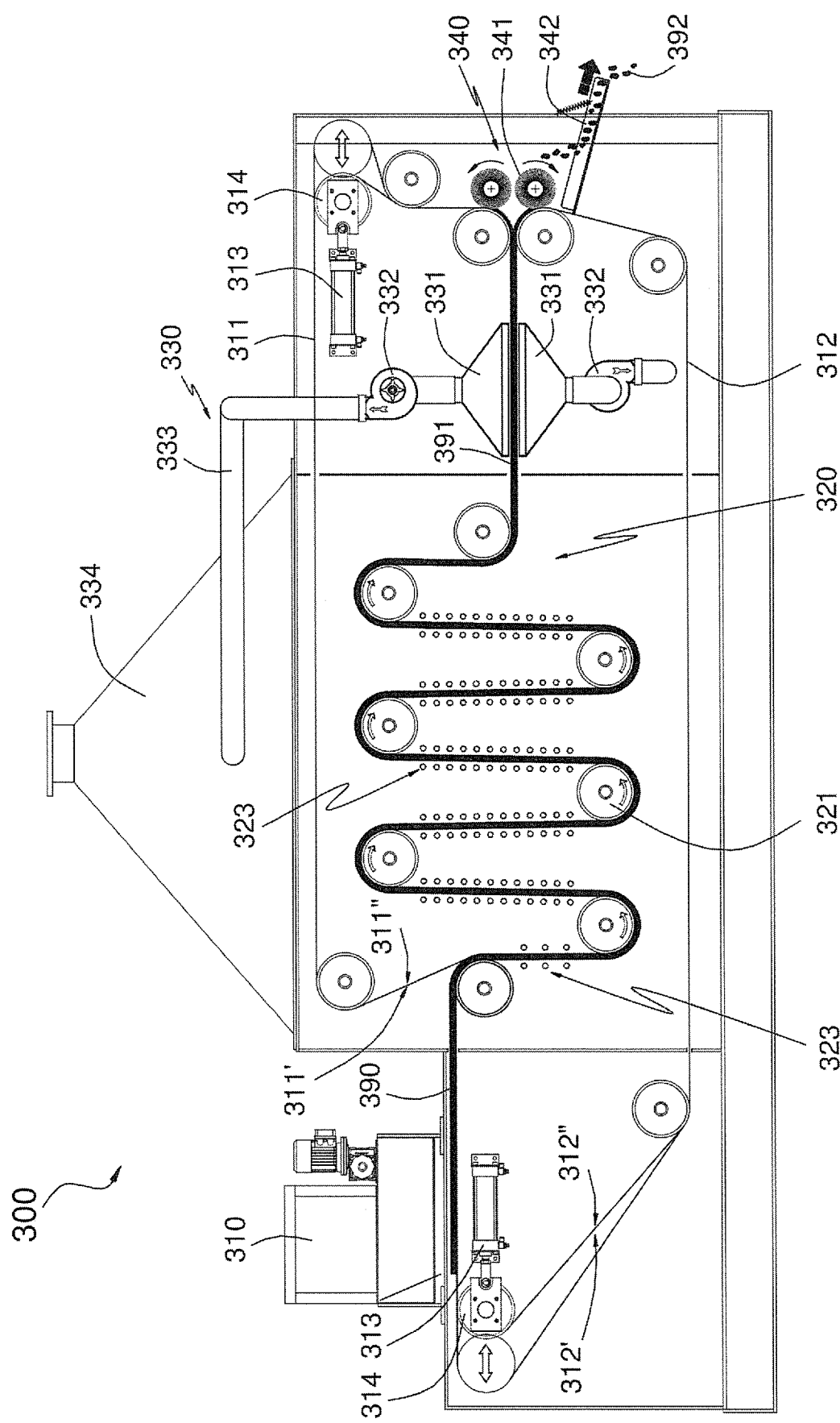
FIG. 6 shows an illustrative view of a third embodiment of an apparatus of the present invention.

In a third embodiment of the present invention as shown in FIG. 6, a drying apparatus 300 includes a drying chamber 320 having processing rollers 321 and heat induction elements 323. In this embodiment, the heat induction elements 323 are not arranged at and about the exterior circumference of processing rollers 321, but rather, heat induction elements 323 are arranged along and proximate to the second sides 311", 312" of belts 311, 312, between neighbouring processing rollers 321. In this arrangement, the sludge 390 undergoes sequential heating by both belts 311, 312, and compression by the belts 311, 312 and processing rollers 321. Having at least one induction heating element 323 in this arrangement is preferred because drying can occur on both sides of the sludge 390 which allows for thicker sludge to be processed each time. Hence there is an increase in sludge processing capacity. Heating of the surfaces of the sludge 390 in contact with the first sides 311', 312' of the belts 311, 312 occur at the same time because heat is concurrently induced in the belts 311, 312 by the heat induction elements 323 positioned at the sides of belts 311, 312. It would however be appreciated that a set of heat induction elements being arranged only at the side of one of the belts, may be sufficient to concurrently induce heat in both belts 311, 312. Other than the differences between the drying chamber 320, drying chamber 220 and drying chamber 120 as described above, drying apparatus 300 operates in a similar manner as that of drying apparatus 100 and drying apparatus 200.

Figure 7:
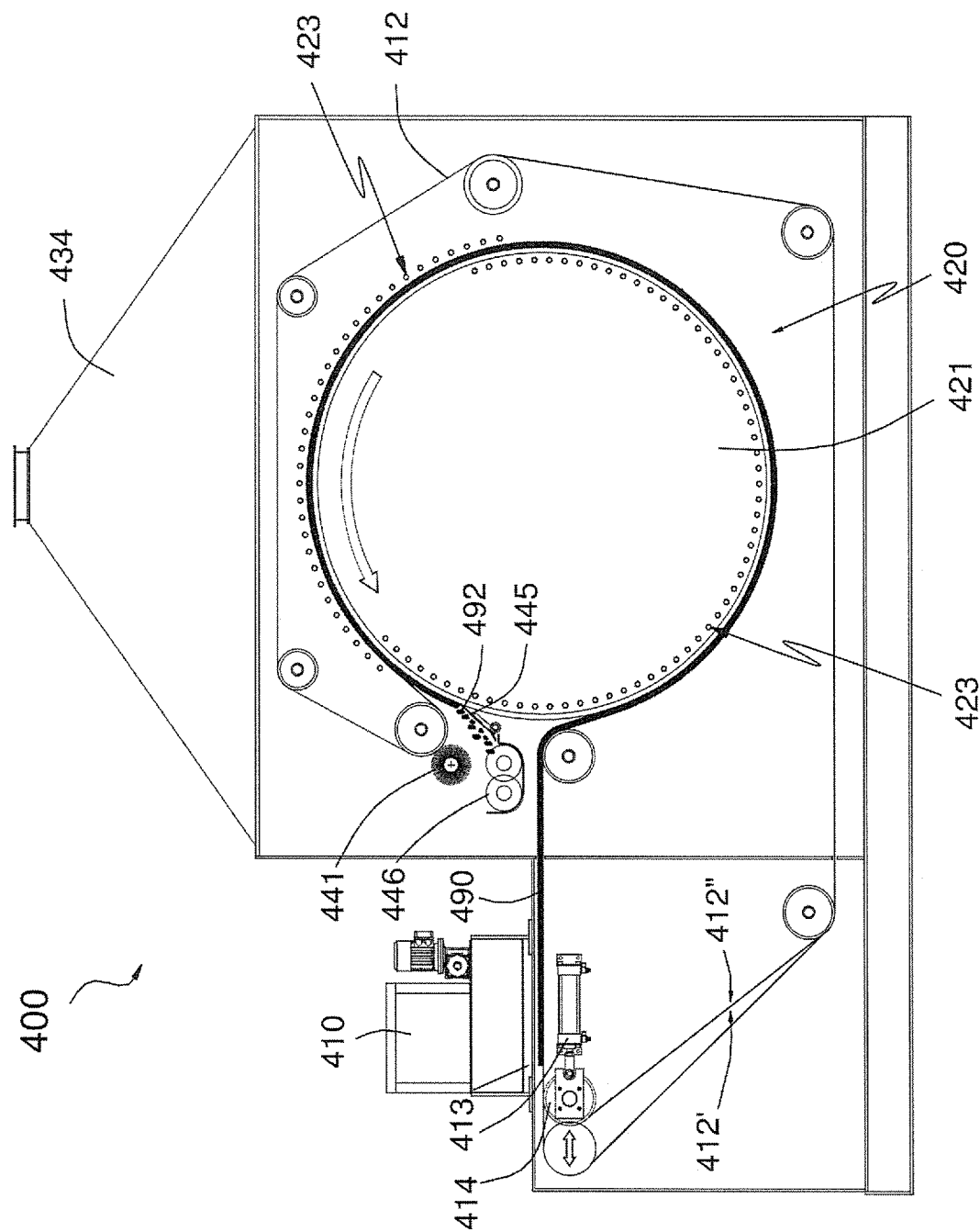
FIG. 7 shows an illustrative view of a fourth embodiment of an apparatus of the present invention.

A fourth embodiment of the present invention is provided in FIG. 7 where a drying apparatus 400 includes one endless filter belt 412 which is driven around a processing roller 421. The belt 412 is made of metal, which includes but is not limited to aluminium, copper, brass, iron, steel, alloys and composites thereof. It would be appreciated that the material selected to form belt 412 comprises a resistive material which allows for efficient generation of heat by induction and a conductive material which allows for the substantially homogenous distribution of the heat. The belt 412 preferably has pores and/or slots. Preferably, the belt 412 is made of fine metal wire, where the belt 412 is porous with very fine pore size. The belt 412 is preferably porous so that the magnetic fields and induced currents generated by the heat induction elements 423 can effectively penetrate the belt 412 and efficiently heat the belt 412. However depending on application, it would be appreciated that the belt 412 may be made from other suitable material, such as synthetic fabrics, which can incorporate material such as metal so as to allow the induction of heat via the heat induction elements 423 in the belt 412. The belt 412 has a first side 412' and a second side 412".

The processing roller 421 is preferably constructed substantially from a non-metal material, which includes but is not limited to ceramics, glass fibers, and composites thereof. Preferably, the roller 421 comprises a layer of metal (not shown) on its exterior circumferential surface. The layer of metal may be a sleeve in which the roller 421 is adapted to fit. The layer of metal will allow for the induction of heat only at the exterior circumferential surface of the roller 421, for heating the sludge 490 that is in contact with the roller 421. The exterior circumferential surface of roller 421 can comprise projections (not shown), like the projections 128 in FIGS. 2, 2a, 2b and 3.

During operation, the belt 412 is tensioned by two air cylinders 413 connected to the shaft ends of a take-up roller 414. The processing roller 421 is rotatable about its own central axis. A motor (not shown) rotates the processing roller 421 which in turn moves and drives the belt 412 along with input sludge 490 through the drying chamber 420. It would be understood that the belt 412 may be driven by another roller which is not processing roller 421, or by any suitable means. It would also be understood that only one driving means may be involved in moving and driving the belt 412. A feeder 410 feeds and distributes sludge 490 on the first side 412' of the belt 412.

Heat induction elements 423 are positioned at the interior of the processing roller 421, about a portion of an interior circumferential surface, and also at the exterior of the processing roller 421, proximate to and about a portion of an exterior circumferential surface. It would be understood that the portion of the interior and exterior circumferential surfaces where the heat induction elements 423 are arranged, can be a substantial portion, whereby the heat induction elements 423 cover most of the interior and exterior circumferential surfaces. The heat induction elements 423 are connected to a source of high frequency energy (not shown). Magnetic fields and induced currents are produced at the heat induction elements 423. The use of heat induction elements 423 allow for the operating temperature of drying apparatus 400 to be reached very quickly from room temperature, within a few seconds, and also allows the drying apparatus 400 to be cooled down very quickly, within a few minutes, which can be assisted by cooling means known in the art, e.g. a fan or blower. The belt 412 and processing roller 421 are in close proximity to the heat induction elements 423, hence the belt 412 and the layer of metal on the roller 421 are heated through induction by the magnetic fields from the heat induction elements 423. Depending on the application, the number of heat induction elements 423 can vary.

While the sludge 490 which is held in between and sandwiched by the belt 412 and processing roller 421 negotiates about the arc of the circumferential surface of the processing roller 421, belt 412 urges via its first side 412', the sludge 490 towards the exterior circumferential surface of processing roller 421 such that the sludge 490 is squeezed due to radial movement, increasing pressure impact and shear on the sludge 490, thereby resulting in higher compactness and larger contact area with belt 412 and processing roller 421. The urging mechanism of the belt 412 towards the exterior circumferential surface of processing rollers 421 is achieved by the tensioning of the belt 412 by air cylinders 413 and take-up rollers 414. The air cylinders 413 and take-up rollers 414 can maintain or vary the tension in the belt 412, and affect the compacting of the sludge 490.

Heat induced in the belt 412 and the layer of metal on the roller 421 is directly transferred to the compacted input sludge 490, and the moisture within the sludge evaporates.

At the beginning of and during the drying process, the fluids within the sludge 490 in contact with the first side 412' of the belt 412 and the layer of metal on the exterior circumferential surface of processing roller 421 are removed through heat conduction. As fluids are heated away at the sludge surface (e.g. evaporation of moisture), areas of low pressure are created at the sludge surface which will cause fluids to flow from the inner portions of sludge 490 to the surface of the sludge 490 in contact with the first side 412' of the belt 412 and layer of metal on processing roller 421 by capillary pressure.

At the end of the drying process, the dried sludge on the processing roller 421 is scrapped off from the processing roller 421 with a drum scrapper 445 and a motorized brush 441 to brush off the sludge 490 on the first side 412' of the belt 412. The final dried sludge 492 drops into a screw conveyor 446 and is discharged from the side of the drying apparatus 400.

It is to be understood that the above embodiments have been provided only by way of exemplification of this invention, such as those detailed below, and that further modifications and improvements thereto, as would be apparent to persons skilled in the relevant art, are deemed to fall within the broad scope and ambit of the present invention described. In particular, the following additions and/or modifications can be made without departing from the scope of the invention:

- The moisture ventilator may be omitted depending on the application and requirements, or it may be substituted by another suitable device or apparatus.
- The diameter of the processing rollers and accordingly, the cross-sectional circumference of the processing rollers may vary depending on the application and requirements.
- Tensioning of the belts need not be achieved only by air cylinders and take-up rollers, and may be achieved by other suitable means known in the art.
- The number of air cylinders and take-up rollers in the drying apparatus will depend on the application and requirements.
- The width of the belts (distance from one end of the belt to its other end, where said distance is perpendicular to the direction in which the belt is driven) may be equal or less than the length of the processing rollers, i.e. the distance from one end of a processing roller to the other end, along the central axis which the processing roller rotates.

Furthermore, although individual embodiments have been discussed it is to be understood that the invention covers combinations of the embodiments that have been discussed as well.

The invention described herein may include one or more range of values (e.g. distance and temperature). A range of values will be understood to include all values within the range, including the values defining the range, and values adjacent to the range which lead to the same or substantially the same outcome as the values immediately adjacent to that value which defines the boundary to the range.

The invention claimed is:

1. An apparatus for drying a substance, the apparatus comprising:
    at least one non-metal roller rotatable about a central axis;
    a first metal belt having a first and a second side, the first side of the first belt adapted to receive the substance; and
    one or more heat induction elements arranged proximate to and about a portion of a surface of the roller,
    where in operation, the one or more heat induction elements induce heat in the first belt to heat the substance to remove fluids from the substance, and do not induce heat in the roller, and wherein the first belt urges via its first side, the substance towards a portion of an exterior circumferential surface of the roller.

2. The apparatus according to claim 1, wherein the first belt is made of fine metal fibres, and wherein the first belt is porous.

3. The apparatus according to claim 1, wherein at least one heat induction element is arranged within the roller, proximate to and about a portion of an interior circumferential surface of the roller, and/or wherein at least one heat induction element is arranged proximate to and about the portion of the exterior circumferential surface of the roller, where in operation, the substance and the first belt is driven between the portion of the exterior circumferential surface of the roller and the heat induction element.

4. The apparatus according to claim 1, the apparatus further comprising at least one tensioning means adapted to tension the first belt, and/or a dislodging means for dislodging the substance from the first belt.

5. The apparatus according to claim 1, the apparatus further comprising a second metal belt having a first and second side, where in operation, the substance is sandwiched between the first side of the first belt and the first side of the second belt, and wherein the first belt urges via its first side, the substance and the second belt towards the portion of the exterior circumferential surface of the roller.

6. The apparatus according to claim 5, wherein the second belt is made of fine metal fibres, and wherein the second belt is porous.

7. The apparatus according to claim 5, where in operation, the one or more heat induction elements induce heat in the second belt to heat the substance and do not induce heat in the roller.

8. The apparatus according to claim 5, the apparatus having a plurality of rollers, where in operation, the second belt urges via its first side, the substance and the first belt towards the portion of an exterior circumferential surface of at least one roller.

9. The apparatus according to claim 5, the apparatus further comprising at least one tensioning means adapted to tension the second belt, and/or a dislodging means for dislodging the substance from the second belt.

10. The apparatus according to claim 1, the apparatus further comprising an exhaust adapted to remove fluids from the apparatus,
    a ventilator adapted to remove fluids from a surface of the substance, and/or a device adapted to distribute the substance on the first side of the first belt.

11. A drying apparatus non-metal roller to be used in an apparatus according to claim 1, the roller comprising a plurality of projections and a plurality of channels, the plurality of projections and channels arranged on a portion of the exterior circumferential surface of the roller, wherein the channels are adapted to allow the escape of fluids from the substance during operation.

12. The roller of claim 11, wherein the roller is operable at a temperature range of 100° C. to 400° C.

13. The roller of claim 11, wherein the plurality of projections are constructed from a material different from the material of the roller.

14. The roller according to claim 11, wherein the plurality of projections comprise ridges arranged substantially along the length of the roller on the exterior circumferential surface of the roller, or wherein the plurality of projections comprise ridges arranged circumferentially on and around the portion of the exterior circumferential surface of the roller.

15. The roller according to claim 11, wherein the plurality of projections comprise rods, and the channels comprise slots, or wherein the roller further comprises a sleeve on the exterior circumferential surface thereof, and the plurality of projections and channels are arranged on an outer surface of the sleeve.

16. The roller according to claim 11, wherein the roller comprises a metal layer on a portion of the exterior circumferential surface of the roller.

17. A method of drying a substance, the method comprising the steps of:
distributing the substance on a first metal belt having a first and a second side, the first side of the first belt adapted to receive the substance;
inducing heat in the first belt via one or more heat induction elements arranged proximate to and about a portion of a surface of at least one non-metal roller rotatable about a central axis, to heat the substance to remove fluids from the substance, wherein heat is not induced in the roller by the one or more heat induction elements; and
urging the substance via the first side of the first belt towards a portion of an exterior circumferential surface of the roller.

18. The method according to claim 17, wherein at least one heat induction element is arranged within the roller, proximate to and about a portion of an interior circumferential surface of the roller, and/or wherein at least one heat induction element is arranged proximate to and about the portion of the exterior circumferential surface of the roller, and wherein the method further comprises the step of driving the substance and the first belt between the portion of the exterior circumferential surface of the roller and the at least one heat induction element.

19. The method according to claim 17, the method further comprising tensioning the first belt, and/or dislodging the substance from the first belt.

20. The method according to claim 17, the method further comprising the step of sandwiching the substance between a first side of a second metal belt and the first side of the first belt, and urging via the first side of the first belt, the substance and the second belt towards a portion of the exterior circumferential surface of the roller.

21. The method according to claim 20, the method further comprising the step of inducing heat in the second belt via the one or more heat induction elements to heat the substance, wherein heat is not induced in the roller by the one or more heat induction elements.

22. The method according to claim 20, the method further comprising the step of urging via the first side of the second belt, the substance and the first belt towards the portion of an exterior circumferential surface of at least one roller, wherein there is a plurality of rollers.

23. The method according to claim 20, the method further comprising tensioning the second belt, and/or dislodging the substance from the second belt.

24. The method according to claim 17, the method further comprising the step of removing fluids via an exhaust, and/or the step of removing fluids from a surface of the substance via a ventilator.

* * * * *